United States Patent
Knight et al.

(10) Patent No.: US 11,235,275 B2
(45) Date of Patent: Feb. 1, 2022

(54) FILTRATION SEALING SYSTEM

(71) Applicant: Cummins Filtration IP, Inc., Columbus, IN (US)

(72) Inventors: Jessie A. Knight, Oregon, WI (US); Scott W. Schwartz, Cottage Grove, WI (US); Gregory K. Loken, Stoughton, WI (US); Scott G. Manke, Sun Prairie, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 227 days.

(21) Appl. No.: 16/493,511

(22) PCT Filed: Feb. 20, 2018

(86) PCT No.: PCT/US2018/018696
§ 371 (c)(1),
(2) Date: Sep. 12, 2019

(87) PCT Pub. No.: WO2018/169648
PCT Pub. Date: Sep. 20, 2018

(65) Prior Publication Data
US 2021/0129067 A1 May 6, 2021

Related U.S. Application Data

(60) Provisional application No. 62/472,170, filed on Mar. 16, 2017.

(51) Int. Cl.
*B01D 46/00* (2006.01)
*B01D 46/10* (2006.01)
(Continued)

(52) U.S. Cl.
CPC ....... *B01D 46/521* (2013.01); *B01D 46/0002* (2013.01); *B01D 46/10* (2013.01); *B01D 46/4227* (2013.01); *B01D 2271/022* (2013.01)

(58) Field of Classification Search
CPC ...... B01D 46/00; B01D 46/10; B01D 46/001; B01D 46/0002; B01D 46/521;
(Continued)

(56) References Cited

U.S. PATENT DOCUMENTS 2,025,009 A 12/1935 Baker
2,093,877 A 9/1937 Von
(Continued)

FOREIGN PATENT DOCUMENTS

CN 1130539 A 9/1996
CN 1139884 A 1/1997
(Continued)

OTHER PUBLICATIONS

Akro-Mils, "Nest & Stack Totes," retrieved from http://web.archive.org/web/20150323114331/https://akro-mils.com/produts/types/plastic-storage-containers/nest-stack-totes, 1 page (2015).
(Continued)

*Primary Examiner* — Minh Chau T Pham
(74) *Attorney, Agent, or Firm* — Foley & Lardner LLP (57) ABSTRACT

A filtration system comprising a housing defining a central compartment, an outlet and a housing sealing surface having a first non-planar surface. A cover is removably coupled to the housing. The cover defines an inlet and comprises a cover sealing surface having a second non-planar surface. The filtration system also includes a filter element comprising a filter media and a seal member. The filter element is removably received in the central compartment. The seal member comprising a complimentary non-planar sealing surface that matches the first non-planar surface and the second non-planar surface such that the seal member axially pinched between the housing and the cover by the housing sealing surface and the cover sealing surface to form a first
(Continued)

seal between the seal member and the housing and a second seal between the seal member and the cover.

13 Claims, 8 Drawing Sheets

(51) Int. Cl.
  *B01D 46/42*  (2006.01)
  *B01D 46/52*  (2006.01)
(58) Field of Classification Search
  CPC .......... B01D 46/4227; B01D 2265/025; B01D 2265/026; B01D 2271/022; F02M 35/024; F02M 35/0202; F02M 35/02416
  USPC ............. 55/385.3, 498, 502, 537; 123/198 E
  See application file for complete search history.

(56) References Cited

U.S. PATENT DOCUMENTS

| | | |
|---|---|---|
| 2,270,969 A | 1/1942 | Robinson |
| 2,306,325 A | 12/1942 | Allain |
| 2,910,332 A | 10/1959 | Madsen |
| 2,915,188 A | 12/1959 | Puker |
| 2,955,028 A | 10/1960 | Rowlands |
| 3,025,963 A | 3/1962 | Bauer |
| 3,224,592 A | 12/1965 | Burns |
| 3,383,841 A | 5/1968 | Olson |
| 3,494,113 A | 2/1970 | Kinney |
| 3,576,095 A | 4/1971 | Rivers |
| 3,582,095 A | 6/1971 | Bogaert |
| 3,598,738 A | 8/1971 | Du Pont |
| 3,645,402 A | 2/1972 | Alexander et al. |
| 3,687,849 A | 8/1972 | Abbott |
| 3,749,247 A | 7/1973 | Rohde |
| 4,014,794 A | 3/1977 | Lewis |
| 4,061,572 A | 12/1977 | Cohen et al. |
| 4,066,559 A | 1/1978 | Rohde |
| 4,075,097 A | 2/1978 | Paul |
| 4,075,098 A | 2/1978 | Paul et al. |
| 4,080,185 A | 3/1978 | Richter et al. |
| 4,128,251 A | 12/1978 | Gaither et al. |
| 4,129,429 A | 12/1978 | Humbert et al. |
| 4,144,169 A | 3/1979 | Grueschow |
| 4,181,313 A | 1/1980 | Hillier et al. |
| 4,211,543 A | 7/1980 | Tokar et al. |
| 4,257,890 A | 3/1981 | Hurner |
| 4,300,928 A | 11/1981 | Sugie |
| 4,324,213 A | 4/1982 | Kasting et al. |
| 4,364,751 A | 12/1982 | Copley |
| 4,402,912 A | 9/1983 | Krueger et al. |
| 4,410,427 A | 10/1983 | Wydeven |
| 4,473,471 A | 9/1984 | Robichaud et al. |
| 4,572,522 A | 2/1986 | Smagatz |
| 4,589,983 A | 5/1986 | Wydevan |
| 4,600,420 A | 7/1986 | Wydeven et al. |
| 4,617,122 A | 10/1986 | Kruse et al. |
| 4,738,776 A | 4/1988 | Brown |
| 4,755,289 A | 7/1988 | Villani |
| 4,782,891 A | 11/1988 | Cheadle et al. |
| 4,826,517 A | 5/1989 | Norman |
| 4,861,359 A | 8/1989 | Tettman |
| 4,865,636 A | 9/1989 | Raber |
| 4,915,831 A | 4/1990 | Taylor |
| 4,925,561 A | 5/1990 | Ishii et al. |
| 4,951,834 A | 8/1990 | Aikins |
| 4,979,969 A | 12/1990 | Herding |
| 5,024,268 A | 6/1991 | Cheadle et al. |
| 5,050,549 A | 9/1991 | Sturmon |
| 5,069,799 A | 12/1991 | Brownawell et al. |
| 5,071,456 A | 12/1991 | Binder et al. |
| 5,094,745 A | 3/1992 | Reynolds |
| 5,120,334 A | 6/1992 | Cooper |
| 5,203,994 A | 4/1993 | Janik |
| 5,213,596 A | 5/1993 | Kume et al. |
| 5,222,488 A | 6/1993 | Forsgren |
| 5,223,011 A | 6/1993 | Hanni |
| 5,225,081 A | 7/1993 | Brownawell |
| 5,228,891 A | 7/1993 | Adiletta |
| 5,258,118 A | 11/1993 | Gouritin et al. |
| 5,298,160 A | 3/1994 | Ayers et al. |
| 5,302,284 A | 4/1994 | Zeiner et al. |
| 5,342,511 A | 8/1994 | Brown et al. |
| 5,382,355 A | 1/1995 | Arlozynski |
| 5,391,212 A | 2/1995 | Ernst et al. |
| 5,435,346 A | 7/1995 | Tregidgo et al. |
| 5,459,074 A | 10/1995 | Muoni |
| 5,472,379 A | 12/1995 | Andress et al. |
| 5,472,463 A | 12/1995 | Herman et al. |
| 5,484,466 A | 1/1996 | Drown et al. |
| 5,494,497 A | 2/1996 | Lee |
| 5,498,332 A | 3/1996 | Handtmann |
| 5,512,074 A | 4/1996 | Hanni et al. |
| 5,531,848 A | 7/1996 | Brinda et al. |
| 5,556,542 A | 9/1996 | Berman et al. |
| 5,560,330 A | 10/1996 | Andress et al. |
| 5,562,825 A | 10/1996 | Yamada et al. |
| 5,569,311 A | 10/1996 | Oda et al. |
| 5,575,826 A | 11/1996 | Gillingham et al. |
| 5,591,330 A | 1/1997 | Lefebvre |
| 5,605,554 A | 2/1997 | Kennedy |
| 5,662,799 A | 9/1997 | Hudgens et al. |
| 5,672,399 A | 9/1997 | Kahlbaugh et al. |
| 5,709,722 A | 1/1998 | Nagai et al. |
| 5,720,790 A | 2/1998 | Kometani et al. |
| 5,738,785 A | 4/1998 | Brown et al. |
| 5,753,116 A | 5/1998 | Baumann et al. |
| 5,753,117 A | 5/1998 | Jiang |
| 5,759,217 A | 6/1998 | Joy |
| 5,772,883 A | 6/1998 | Rothman et al. |
| 5,793,566 A | 8/1998 | Scura et al. |
| 5,795,361 A | 8/1998 | Lanier et al. |
| 5,803,024 A | 9/1998 | Brown |
| 5,820,646 A | 10/1998 | Gillingham et al. |
| 5,830,371 A | 11/1998 | Smith et al. |
| 5,853,439 A | 12/1998 | Gieseke et al. |
| 5,863,424 A | 1/1999 | Lee |
| 5,891,402 A | 4/1999 | Sassa et al. |
| 5,893,939 A | 4/1999 | Rakocy et al. |
| 5,902,364 A | 5/1999 | Tokar et al. |
| 5,948,248 A | 9/1999 | Brown |
| 5,985,143 A | 11/1999 | Lin |
| 6,045,692 A | 4/2000 | Bilski et al. |
| D425,189 S | 5/2000 | Gillingham et al. |
| 6,086,763 A | 7/2000 | Baumann |
| 6,096,208 A | 8/2000 | Connelly et al. |
| 6,098,575 A | 8/2000 | Mulshine et al. |
| 6,099,612 A | 8/2000 | Bartos |
| 6,117,202 A | 9/2000 | Wetzel |
| 6,123,746 A | 9/2000 | Alvin et al. |
| 6,129,852 A | 10/2000 | Elliott et al. |
| 6,149,700 A | 11/2000 | Morgan et al. |
| 6,171,355 B1 | 1/2001 | Gieseke et al. |
| 6,179,890 B1 | 1/2001 | Ramos et al. |
| D437,402 S | 2/2001 | Gieseke et al. |
| 6,190,432 B1 | 2/2001 | Gieseke et al. |
| 6,196,019 B1 | 3/2001 | Higo et al. |
| 6,217,627 B1 | 4/2001 | Vyskocil et al. |
| 6,231,630 B1 | 5/2001 | Ernst et al. |
| 6,235,194 B1 | 5/2001 | Jousset |
| 6,235,195 B1 | 5/2001 | Tokar |
| 6,238,554 B1 | 5/2001 | Martin et al. |
| 6,238,561 B1 | 5/2001 | Liu et al. |
| 6,261,334 B1 | 7/2001 | Morgan et al. |
| 6,264,831 B1 | 7/2001 | Hawkins et al. |
| 6,264,833 B1 | 7/2001 | Reamsnyder et al. |
| RE37,369 E | 9/2001 | Hudgens et al. |
| 6,293,984 B1 | 9/2001 | Oda et al. |
| 6,306,193 B1 | 10/2001 | Morgan et al. |
| D450,828 S | 11/2001 | Tokar |
| 6,348,085 B1 | 2/2002 | Tokar et al. |
| D455,826 S | 4/2002 | Gillingham et al. |
| 6,375,700 B1 | 4/2002 | Jaroszczyk et al. |

(56) References Cited

U.S. PATENT DOCUMENTS

| | | | |
|---|---|---|---|
| 6,379,564 B1 | 4/2002 | Rohrbach et al. |
| 6,391,076 B1 | 5/2002 | Jaroszczyk et al. |
| 6,398,832 B2 | 6/2002 | Morgan et al. |
| 6,402,798 B1 | 6/2002 | Kallsen et al. |
| 6,416,561 B1 | 7/2002 | Kallsen et al. |
| 6,447,566 B1 | 9/2002 | Rivera et al. |
| 6,475,379 B2 | 11/2002 | Jousset et al. |
| 6,478,018 B2 | 11/2002 | Fedorowicz et al. |
| 6,478,019 B2 | 11/2002 | Fedorowicz et al. |
| 6,478,958 B1 | 11/2002 | Beard et al. |
| 6,482,247 B2 | 11/2002 | Jaroszczyk et al. |
| 6,511,599 B2 | 1/2003 | Jaroszczyk et al. |
| 6,517,598 B2 | 2/2003 | Anderson et al. |
| 6,537,453 B2 | 3/2003 | Beard et al. |
| D473,637 S | 4/2003 | Golden |
| 6,547,857 B2 | 4/2003 | Gieseke et al. |
| 6,554,139 B1 | 4/2003 | Maxwell et al. |
| 6,571,962 B2 | 6/2003 | Thomas |
| 6,596,165 B2 | 7/2003 | Koivula |
| 6,610,126 B2 | 8/2003 | Xu et al. |
| 6,623,636 B2 | 9/2003 | Rohrbach et al. |
| 6,641,637 B2 | 11/2003 | Kallsen et al. |
| 6,673,136 B2 | 1/2004 | Gillingham et al. |
| 6,676,721 B1 | 1/2004 | Gillingham et al. |
| 6,709,588 B2 | 3/2004 | Pavlin et al. |
| 6,740,234 B1 | 5/2004 | Williams et al. |
| 6,743,317 B2 | 6/2004 | Wydeven |
| 6,746,518 B2 | 6/2004 | Gieseke et al. |
| 6,787,033 B2 | 9/2004 | Beard et al. |
| 6,823,996 B2 | 11/2004 | Durre |
| 6,827,750 B2 | 12/2004 | Drozd et al. |
| 6,835,304 B2 | 12/2004 | Jousset et al. |
| 6,837,920 B2 | 1/2005 | Gieseke et al. |
| 6,843,916 B2 | 1/2005 | Burrington et al. |
| 6,860,241 B2 | 3/2005 | Martin et al. |
| 6,893,571 B2 | 5/2005 | Harenbrock et al. |
| 6,902,598 B2 | 6/2005 | Gunderson et al. |
| 6,919,023 B2 | 7/2005 | Merritt et al. |
| 6,922,894 B2 | 8/2005 | Durre |
| 6,939,464 B1 | 9/2005 | Jiang et al. |
| 6,953,124 B2 | 10/2005 | Winter et al. |
| 6,966,940 B2 | 11/2005 | Krisko et al. |
| 6,969,461 B2 | 11/2005 | Beard et al. |
| 6,984,319 B2 | 1/2006 | Merritt et al. |
| 6,996,940 B2 | 2/2006 | Beasley |
| 6,998,045 B2 | 2/2006 | Durre |
| 7,001,450 B2 | 2/2006 | Gieseke et al. |
| 7,008,467 B2 | 3/2006 | Krisko et al. |
| 7,018,531 B2 | 3/2006 | Eilers et al. |
| 7,048,501 B2 | 5/2006 | Katayama et al. |
| 7,070,641 B1 | 7/2006 | Gunderson et al. |
| 7,081,145 B2 | 7/2006 | Gieseke et al. |
| 7,090,711 B2 | 8/2006 | Gillingham et al. |
| 7,153,422 B2 | 12/2006 | Herman et al. |
| 7,156,991 B2 | 1/2007 | Herman et al. |
| 7,160,451 B2 | 1/2007 | Hacker et al. |
| 7,182,863 B2 | 2/2007 | Eilers et al. |
| 7,182,864 B2 | 2/2007 | Brown et al. |
| 7,211,124 B2 | 5/2007 | Brown et al. |
| 7,217,361 B2 | 5/2007 | Connor et al. |
| 7,237,682 B2 | 7/2007 | Reynolds et al. |
| 7,247,183 B2 | 7/2007 | Connor et al. |
| 7,258,719 B2 | 8/2007 | Miller et al. |
| 7,282,075 B2 | 10/2007 | Sporre et al. |
| 7,311,747 B2 | 12/2007 | Adamek et al. |
| 7,338,544 B2 | 3/2008 | Sporre et al. |
| 7,344,582 B2 | 3/2008 | Pearson et al. |
| 7,351,270 B2 | 4/2008 | Engelland et al. |
| 7,396,375 B2 | 7/2008 | Nepsund et al. |
| 7,425,226 B2 | 9/2008 | Powell |
| 7,491,254 B2 | 2/2009 | Krisko et al. |
| 7,494,017 B2 | 2/2009 | Miller |
| 7,524,416 B1 | 4/2009 | Bergmen |
| 7,540,895 B2 | 6/2009 | Furseth et al. |
| D600,790 S | 9/2009 | Nelson et al. |
| 7,582,130 B2 | 9/2009 | Ng et al. |
| 7,614,504 B2 | 11/2009 | South et al. |
| 7,625,419 B2 | 12/2009 | Nelson et al. |
| 7,645,310 B2 | 1/2010 | Krisko et al. |
| 7,655,074 B2 | 2/2010 | Nepsund et al. |
| 7,662,216 B1 | 2/2010 | Terres et al. |
| 7,674,308 B2 | 3/2010 | Krisko et al. |
| 7,682,416 B2 | 3/2010 | Engelland et al. |
| 7,731,753 B2 | 6/2010 | Reo et al. |
| 7,776,139 B2 | 8/2010 | Schwandt et al. |
| 7,799,108 B2 | 9/2010 | Connor et al. |
| 7,828,869 B1 | 11/2010 | Parikh et al. |
| 7,882,961 B2 | 2/2011 | Menez et al. |
| 7,931,723 B2 | 4/2011 | Cuvelier |
| 7,959,714 B2 | 6/2011 | Smith et al. |
| 7,967,886 B2 | 6/2011 | Schrage et al. |
| 7,972,405 B2 | 7/2011 | Engelland et al. |
| 7,981,183 B2 | 7/2011 | Nepsund et al. |
| 7,993,422 B2 | 8/2011 | Krisko et al. |
| 8,016,903 B2 | 9/2011 | Nelson et al. |
| 8,034,145 B2 | 10/2011 | Boehrs et al. |
| 8,043,504 B2 | 10/2011 | Malgorn |
| 8,048,187 B2 | 11/2011 | Merritt et al. |
| 8,061,530 B2 | 11/2011 | Kindkeppel et al. |
| 8,062,399 B2 | 11/2011 | Nelson et al. |
| 8,096,423 B2 | 1/2012 | Menez et al. |
| 8,097,061 B2 | 1/2012 | Smith et al. |
| 8,101,003 B2 | 1/2012 | Krisko et al. |
| 8,119,002 B2 | 2/2012 | Schiavon et al. |
| 8,146,751 B2 | 4/2012 | Hawkins et al. |
| 8,167,966 B2 | 5/2012 | Amirkhanian et al. |
| 8,177,967 B2 | 5/2012 | Bagci et al. |
| 8,216,470 B2 | 7/2012 | Abdalla et al. |
| 8,220,640 B2 | 7/2012 | Schmitz et al. |
| 8,241,383 B2 | 8/2012 | Schrage et al. |
| 8,276,763 B2 | 10/2012 | Shaam |
| 8,277,532 B2 | 10/2012 | Reichter et al. |
| 8,292,983 B2 | 10/2012 | Reichter et al. |
| 8,328,897 B2 | 12/2012 | Nelson et al. |
| 8,333,890 B2 | 12/2012 | Wells et al. |
| 8,348,064 B2 | 1/2013 | Tandon |
| 8,357,219 B2 | 1/2013 | Boehrs et al. |
| 8,419,938 B2 | 4/2013 | Ries et al. |
| 8,430,657 B2 | 4/2013 | Simonelli et al. |
| 8,440,081 B2 | 5/2013 | Wieczorek |
| 8,480,779 B2 | 7/2013 | Boehrs et al. |
| 8,496,723 B2 | 7/2013 | Reichter et al. |
| 8,501,001 B2 | 8/2013 | Curt et al. |
| 8,506,666 B2 | 8/2013 | Haslebacher |
| 8,518,141 B2 | 8/2013 | Schrage et al. |
| 8,544,158 B2 | 10/2013 | Curt et al. |
| 8,550,656 B2 | 10/2013 | McCarthy et al. |
| 8,562,707 B2 | 10/2013 | Nepsund et al. |
| 8,636,820 B2 | 1/2014 | Reichter et al. |
| 8,652,228 B2 | 2/2014 | Krisko et al. |
| 8,709,119 B2 | 4/2014 | Reichter et al. |
| 8,714,565 B1 | 5/2014 | Cornett et al. |
| 8,753,414 B2 | 6/2014 | Gebert |
| 8,778,043 B2 | 7/2014 | Krisko et al. |
| 8,840,699 B2 | 9/2014 | Bruce et al. |
| 8,845,897 B2 | 9/2014 | Wieczorek et al. |
| 8,852,308 B2 | 10/2014 | Jarrier |
| 8,906,128 B2 | 12/2014 | Reichter et al. |
| 8,911,498 B2 | 12/2014 | Bartish et al. |
| 8,926,725 B2 | 1/2015 | Loken et al. |
| 8,932,465 B2 | 1/2015 | Wells et al. |
| 9,101,883 B2 | 8/2015 | Pugh et al. |
| 9,114,346 B2 | 8/2015 | Schrage et al. |
| 9,211,488 B2 | 12/2015 | South et al. |
| 9,308,476 B2 | 4/2016 | Martin et al. |
| 9,308,482 B2 * | 4/2016 | Kaiser .................. B01D 46/10 |
| 9,320,997 B2 | 4/2016 | Campbell et al. |
| 9,409,107 B2 | 8/2016 | Arakeri et al. |
| 9,415,333 B2 | 8/2016 | Kindkeppel et al. |
| 9,782,706 B1 | 10/2017 | Levy |
| 9,782,708 B2 | 10/2017 | Kindkeppel et al. |
| 10,279,424 B2 * | 5/2019 | Sudermann .......... B23K 26/048 |
| 10,300,417 B2 * | 5/2019 | Wuebbeling .......... B01D 46/10 |
| 10,316,804 B2 * | 6/2019 | Hasenfratz ........ B01D 46/4227 |

(56) References Cited

U.S. PATENT DOCUMENTS

| | | |
|---|---|---|
| 10,343,099 B2* | 7/2019 | Kaiser .................. B01D 35/308 |
| 10,556,200 B2* | 2/2020 | Dirnberger ............. B01D 46/10 |
| 10,662,905 B2* | 5/2020 | Dirnberger ........ B01D 46/4236 |
| 10,729,999 B2 | 8/2020 | Nichols et al. |
| 10,744,443 B2 | 8/2020 | Silvestro |
| 10,835,852 B2 | 11/2020 | Decoster et al. |
| 2001/0032545 A1 | 10/2001 | Goto et al. |
| 2002/0046556 A1 | 4/2002 | Reid |
| 2002/0060178 A1 | 5/2002 | Tsabari |
| 2002/0073850 A1 | 6/2002 | Tokar et al. |
| 2002/0096247 A1 | 7/2002 | Wydeven |
| 2002/0157359 A1 | 10/2002 | Stenersen et al. |
| 2002/0170280 A1 | 11/2002 | Soh |
| 2002/0185007 A1 | 12/2002 | Xu et al. |
| 2002/0185454 A1 | 12/2002 | Beard et al. |
| 2002/0195384 A1 | 12/2002 | Rohrbach et al. |
| 2003/0121845 A1 | 7/2003 | Wagner et al. |
| 2003/0154863 A1 | 8/2003 | Tokar et al. |
| 2003/0184025 A1 | 10/2003 | Matsuki |
| 2003/0218150 A1 | 11/2003 | Blakemore et al. |
| 2004/0035097 A1 | 2/2004 | Schlensker et al. |
| 2004/0040271 A1 | 3/2004 | Kopec et al. |
| 2004/0060861 A1 | 4/2004 | Winter et al. |
| 2004/0091652 A1 | 5/2004 | Kikuchi et al. |
| 2004/0091654 A1 | 5/2004 | Kelly et al. |
| 2004/0140255 A1 | 7/2004 | Merritt et al. |
| 2004/0173097 A1 | 9/2004 | Engelland et al. |
| 2004/0187689 A1 | 9/2004 | Sporre et al. |
| 2004/0221555 A1 | 11/2004 | Engelland et al. |
| 2004/0226443 A1 | 11/2004 | Gillingham et al. |
| 2005/0019236 A1 | 1/2005 | Martin et al. |
| 2005/0024061 A1 | 2/2005 | Cox et al. |
| 2005/0166561 A1 | 8/2005 | Schrage et al. |
| 2005/0173325 A1 | 8/2005 | Klein et al. |
| 2005/0193695 A1 | 9/2005 | Holmes et al. |
| 2005/0194312 A1 | 9/2005 | Niemeyer et al. |
| 2005/0224061 A1 | 10/2005 | Ulrich et al. |
| 2005/0252848 A1 | 11/2005 | Miller |
| 2006/0064956 A1 | 3/2006 | Connor et al. |
| 2006/0113233 A1 | 6/2006 | Merritt et al. |
| 2006/0118474 A1 | 6/2006 | Kolczyk et al. |
| 2006/0180537 A1 | 8/2006 | Loftis et al. |
| 2006/0213139 A1 | 9/2006 | Stramandinoli |
| 2007/0037428 A1 | 2/2007 | Annecke |
| 2007/0095744 A1 | 5/2007 | Bagci et al. |
| 2007/0175815 A1 | 8/2007 | Thomas |
| 2007/0240392 A1 | 10/2007 | Ng et al. |
| 2007/0261374 A1 | 11/2007 | Nelson et al. |
| 2007/0267338 A1 | 11/2007 | Menez et al. |
| 2008/0011672 A1 | 1/2008 | Schwartz et al. |
| 2008/0022641 A1 | 1/2008 | Engelland et al. |
| 2008/0035587 A1 | 2/2008 | Wieczorek et al. |
| 2008/0047132 A1 | 2/2008 | Wieczorek |
| 2008/0087589 A1 | 4/2008 | Grzonka et al. |
| 2008/0107765 A1 | 5/2008 | Considine et al. |
| 2008/0110142 A1 | 5/2008 | Nelson et al. |
| 2008/0179263 A1 | 7/2008 | Wieczorek et al. |
| 2008/0237113 A1 | 10/2008 | Jensen |
| 2008/0250766 A1 | 10/2008 | Schrage et al. |
| 2008/0307759 A1 | 12/2008 | Reichter et al. |
| 2008/0308481 A1 | 12/2008 | Wieczorek et al. |
| 2009/0014381 A1 | 1/2009 | South et al. |
| 2009/0026124 A1 | 1/2009 | Schmitz et al. |
| 2009/0050554 A1 | 2/2009 | Shaam |
| 2009/0057213 A1 | 3/2009 | Schiavon et al. |
| 2009/0057219 A1 | 3/2009 | Bagci et al. |
| 2009/0064646 A1 | 3/2009 | Reichter et al. |
| 2009/0071892 A1 | 3/2009 | Malgorn |
| 2009/0090669 A1 | 4/2009 | Holzmann et al. |
| 2009/0095669 A1 | 4/2009 | South |
| 2009/0126324 A1 | 5/2009 | Smith et al. |
| 2009/0135590 A1 | 5/2009 | McCarthy et al. |
| 2009/0151311 A1 | 6/2009 | Reichter et al. |
| 2009/0193972 A1 | 8/2009 | Schwandt et al. |
| 2009/0241315 A1 | 10/2009 | Menez et al. |
| 2009/0242475 A2 | 10/2009 | Menez et al. |
| 2009/0249754 A1 | 10/2009 | Amirkhanian et al. |
| 2009/0326657 A1 | 12/2009 | Grinberg et al. |
| 2010/0001477 A1 | 1/2010 | Eyers et al. |
| 2010/0043366 A1 | 2/2010 | Boehrs et al. |
| 2010/0051528 A1 | 3/2010 | Derstler et al. |
| 2010/0064646 A1 | 3/2010 | Smith et al. |
| 2010/0065203 A1 | 3/2010 | Tanbour et al. |
| 2010/0077710 A1 | 4/2010 | Severance et al. |
| 2010/0101993 A1 | 4/2010 | Wells et al. |
| 2010/0108590 A1 | 5/2010 | Curt et al. |
| 2010/0114318 A1 | 5/2010 | Gittings et al. |
| 2010/0126919 A1 | 5/2010 | Hawkins et al. |
| 2010/0150764 A1 | 6/2010 | Simonelli et al. |
| 2010/0170209 A1 | 7/2010 | Nelson et al. |
| 2010/0176047 A1 | 7/2010 | Bagci et al. |
| 2010/0186353 A1 | 7/2010 | Ackermann et al. |
| 2010/0200490 A1 | 8/2010 | Martin et al. |
| 2010/0229513 A1* | 9/2010 | Eisengraeber-Pabst ..................... B01D 46/10 55/385.3 |
| 2010/0258493 A1 | 10/2010 | Kindkeppel et al. |
| 2010/0263339 A1 | 10/2010 | Steins et al. |
| 2010/0294707 A1 | 11/2010 | Abdalla et al. |
| 2010/0294712 A1 | 11/2010 | Abdalla et al. |
| 2011/0089104 A1 | 4/2011 | Menez et al. |
| 2011/0132829 A1 | 6/2011 | Tucker et al. |
| 2011/0197556 A1 | 8/2011 | Brown et al. |
| 2011/0203099 A1 | 8/2011 | Curt et al. |
| 2011/0260413 A1 | 10/2011 | Voltenburg et al. |
| 2011/0303604 A1 | 12/2011 | McKenzie |
| 2012/0031059 A1 | 2/2012 | Haslebacher |
| 2012/0055127 A1 | 3/2012 | Holzmann et al. |
| 2012/0061307 A1 | 3/2012 | Kindkeppel et al. |
| 2012/0223008 A1 | 9/2012 | Mbadinga-Mouanda |
| 2013/0015119 A1 | 1/2013 | Pugh et al. |
| 2013/0087497 A1 | 4/2013 | Wells et al. |
| 2013/0220914 A1 | 8/2013 | Hawkins et al. |
| 2013/0291502 A1 | 11/2013 | Gorman |
| 2013/0327696 A1 | 12/2013 | Bagci et al. |
| 2014/0027366 A1 | 1/2014 | Hawkins et al. |
| 2014/0034565 A1 | 2/2014 | Loken et al. |
| 2014/0034566 A1 | 2/2014 | Verdegan et al. |
| 2014/0048468 A1 | 2/2014 | Kindkeppel et al. |
| 2014/0071669 A1 | 3/2014 | McCarthy et al. |
| 2014/0096493 A1 | 4/2014 | Kelmartin et al. |
| 2014/0151275 A1 | 6/2014 | Bradford et al. |
| 2014/0190880 A1 | 7/2014 | Krull |
| 2014/0251895 A1 | 9/2014 | Wagner |
| 2014/0260143 A1 | 9/2014 | Kaiser |
| 2014/0290194 A1 | 10/2014 | Muenkel et al. |
| 2014/0318090 A1 | 10/2014 | Rieger et al. |
| 2015/0013288 A1 | 1/2015 | Hasenfratz et al. |
| 2015/0013289 A1 | 1/2015 | Hasenfratz et al. |
| 2015/0013293 A1 | 1/2015 | Wagner et al. |
| 2015/0033684 A1 | 2/2015 | Pettersson |
| 2015/0060351 A1 | 3/2015 | Kaufmann et al. |
| 2015/0096273 A1 | 4/2015 | Kaiser |
| 2015/0096932 A1 | 4/2015 | Hou et al. |
| 2015/0176544 A1 | 6/2015 | Kaufmann et al. |
| 2015/0202556 A1 | 7/2015 | Hawkins et al. |
| 2015/0231532 A1 | 8/2015 | Pugh et al. |
| 2015/0285381 A1 | 10/2015 | Preston et al. |
| 2016/0023142 A1 | 1/2016 | Arakeri et al. |
| 2016/0045848 A1 | 2/2016 | Campbell et al. |
| 2016/0059172 A1 | 3/2016 | Allott et al. |
| 2016/0082372 A1 | 3/2016 | South et al. |
| 2016/0160816 A1 | 6/2016 | Venkatraman et al. |
| 2016/0169391 A1 | 6/2016 | Emig et al. |
| 2016/0222931 A1 | 8/2016 | Jiang et al. |
| 2016/0228798 A1 | 8/2016 | Page et al. |
| 2016/0258397 A1 | 9/2016 | Jiang et al. |
| 2016/0332103 A1 | 11/2016 | Marks et al. |
| 2017/0078852 A1 | 3/2017 | Tan et al. |

(56) References Cited

U.S. PATENT DOCUMENTS

| | | | |
|---|---|---|---|
| 2018/0318745 A1 | 11/2018 | Nichols et al. | |
| 2020/0324237 A1 | 10/2020 | Moers et al. | |

FOREIGN PATENT DOCUMENTS

| | | | |
|---|---|---|---|
| CN | 1193288 | A | 9/1998 |
| CN | 2296402 | Y | 11/1998 |
| CN | 1486213 | | 3/2004 |
| CN | 1590746 | | 3/2005 |
| CN | 2372041 | Y | 4/2005 |
| CN | 1754612 | A | 4/2006 |
| CN | 101084050 | | 12/2007 |
| CN | 101374582 | A | 2/2009 |
| CN | 201292900 | Y | 8/2009 |
| CN | 101695616 | A | 4/2010 |
| CN | 102083510 | A | 6/2011 |
| CN | 102271780 | | 12/2011 |
| CN | 202746046 | U | 2/2013 |
| CN | 103977647 | | 8/2014 |
| CN | 104220142 | A | 12/2014 |
| CN | 105688498 | A | 6/2016 |
| CN | 106102858 | A | 11/2016 |
| DE | 88 08 632 | U1 | 9/1988 |
| DE | 29613098 | U1 | 9/1996 |
| DE | 10 2008 062 956 | A1 | 6/2010 |
| EP | 0 718 021 | A1 | 6/1996 |
| EP | 0 747 579 | A2 | 12/1996 |
| EP | 0 982 062 | A2 | 3/2000 |
| EP | 1 129 760 | A2 | 9/2001 |
| EP | 1 166 843 | A1 | 1/2002 |
| EP | 1 208 902 | A1 | 5/2002 |
| EP | 1 233 173 | A2 | 8/2002 |
| EP | 1 693 096 | A2 | 8/2006 |
| EP | 1 693 096 | B1 | 8/2006 |
| EP | 1 747 053 | A1 | 1/2007 |
| EP | 3 370 849 | | 9/2018 |
| FR | 2214505 | A1 | 8/1974 |
| GB | 0 970 826 | A | 9/1964 |
| GB | 2 082 932 | A | 3/1982 |
| GB | 2 404 348 | | 2/2005 |
| JP | 60-112320 | A | 6/1985 |
| JP | 01-163408 | A | 6/1989 |
| JP | 01-171615 | A | 7/1989 |
| WO | WO-00/50152 | | 8/2000 |
| WO | WO-00/74818 | A1 | 12/2000 |
| WO | WO-01/05485 | A1 | 1/2001 |
| WO | WO-2004/054684 | A1 | 7/2004 |
| WO | WO-2005/058461 | A1 | 6/2005 |
| WO | WO-2005/077487 | A1 | 8/2005 |
| WO | WO-2006/093981 | A2 | 9/2006 |
| WO | WO-2007/009039 | A1 | 1/2007 |
| WO | WO-2007/089662 | A2 | 8/2007 |
| WO | WO-2012/153430 | A1 | 11/2012 |
| WO | WO-2017/079191 | A1 | 5/2017 |
| WO | WO-2017/120113 | A1 | 7/2017 |

OTHER PUBLICATIONS

Final Office Action on U.S. Appl. No. 16/097,773 DTD Dec. 14, 2020.
Non-Final Office Action on U.S. Appl. No. 16/083,945 DTD Nov. 10, 2020.
U.S. Office Action on U.S. Appl. No. 15/781,585 DTD Nov. 5, 2020.
International Search Report and Written Opinion issued for PCT/US2018/018696, dated Apr. 19, 2018, 13 pages.
First Examination Report for Indian Patent App. No. 3035/KOLNP/2011, dated Feb. 8, 2019, 7 pages.
First Office Action for Chinese Patent App. No. 201080004417.5, dated May 24, 2013, 13 pages (with translation).
International Search Report and Written Opinion for PCT/US2016/063053, dated Feb. 16, 2017, 8 pages.
International Searcn Report and Written Opinion for PCT/US2017/021615, dated Jun. 6, 2017, 8 pages.
International Search Report and Written Opinion for PCT/US2017/030386, dated Jul. 26, 2017, 9 pages.
Office Action for German Patent App. No. 11 2010 001 567.8 dated May 18, 2017, 12 pages (with translation).
Office Action for U.S. Appl. No. 15/236,213 dated Feb. 7, 2017, 9 pages.
Office Action for U.S. Appl. No. 15/236,213 dated Sep. 9, 2016, 10 pages.
Second Office Action for Chinese Patent App. No. 201080004417.5, dated Mar. 5, 2014, 28 pages (with translation).
First Examination Report for Indian Patent App. No. 202047056950 dated Mar. 24, 2021, 5 pages.
First Office Action for Chinese Patent App. No. 201880012627.5 dated Dec. 12, 2020, 22 pages (with English translation).
First Office Action for Chinese Patent Application No. 201880007980.4 dated Jan. 12, 2021, 15 pages (with English translation).
International Search Report & Written Opinion for PCT/US2018/014401 dated May 15, 2018, 9 pages.
International Search Report & Written Opinion for PCT/US2018/018724 dated Apr. 24, 2018, 13 pages.
International Search Report and Written Opinion for PCT/IB2019/056208 dated Nov. 11, 2019, 8 pages.
Non-Final Office Action on U.S. Appl. No. 16/487,209 DTD May 28, 2021.
Notice of Allowance on U.S. Appl. No. 16/083,945 DTD Jul. 8, 2021.
First Office Action issued for Chinese Patent Application No. CN201880018033.5 dated Dec. 24, 2020, 10 pages.
Notice of Allowance issued for U.S. Appl. No. 15/781,585, dated Feb. 3, 2021, 23 pages.
First Office Action for Chinese Patent App. No. 2016800710703 dated Nov. 26, 2019, 29 pages (with translation).
Non-Final Office Action from U.S. Appl. No. 15/781,585, dated Jul. 2, 2020.
Non-Final Office Action from U.S. Appl. No. 16/097,773, dated Jul. 14, 2020.

* cited by examiner

FILTRATION SEALING SYSTEM

CROSS REFERENCE TO RELATED APPLICATIONS

The present application is a national stage of PCT Application No. PCT/US2018/018696, filed Feb. 20, 2018 which claims priority to and benefit of U.S. Provisional Patent Application No. 62/472,170, filed Mar. 16, 2017 and entitled "Filtration Sealing System." The contents of both applications are incorporated herein by reference in their entirety and for all purposes.

TECHNICAL FIELD

The present application relates to filtration systems.

BACKGROUND

Internal combustion engines generally combust a mixture of fuel (e.g., gasoline, diesel, natural gas, etc.) and air. Prior to entering the engine, the intake air is typically passed through a filtration system to remove contaminants (e.g., dust, water, oil, etc.) from the intake air. The filtration system includes a filter element having filter media. As the air passes through the filter media of the filter element, the filter media removes at least a portion of the contaminants in the air thereby preventing unwanted contaminants from entering the internal combustion engine.

The filter elements often include a seal member that is compressed against a component of the filtration system housing, between two components of the filtration system, or a combination thereof. The seal member forms a seal between the filtration system housing and the filter element thereby eliminating the ability of fluid to bypass the filter element (e.g., for air to bypass an air filter element). If an improper filter element (i.e., a non-authorized or non-genuine filter element) is installed in a filtration system, the seal member of the filter element may not form a proper seal, and fluid may bypass the filter element causing damage to downstream components.

SUMMARY

Various example embodiments relate to filter elements and filtration systems having matching axially contoured (i.e., non-planar) seal members and sealing surfaces. One example embodiment relates to a filtration system. The filtration system comprises a housing defining a central compartment and an outlet and comprising a housing sealing surface having a first non-planar surface. The filtration system further comprises a cover removably coupled to the housing, the cover defining an inlet and comprising a cover sealing surface having a second non-planar surface. The filtration system comprises a filter element comprising filter media and a seal member. The filter element is removably received in the central compartment. The seal member comprises a complimentary non-planar sealing surface that matches the first non-planar surface and the second non-planar surface. The seal member is axially pinched between the housing and the cover by the housing sealing surface and the cover sealing surface to form a first seal between the seal member and the housing and a second seal between the seal member and the cover.

Another example embodiment relates to a filter element removably receivable within a central compartment of a housing. The filter element comprises a filter media and a seal member. The seal member comprises a complimentary non-planar sealing surface that matches (a) a first non-planar surface of a housing sealing surface of the housing and (b) a second non-planar surface of a cover sealing surface of a cover that is removably coupleable to the housing. When the filter element, the housing, and the cover are in a fully assembled state, the seal member is axially pinched between the housing and the cover by the housing sealing surface and the cover sealing surface to form a first seal between the seal member and the housing and a second seal between the seal member and the cover.

Still another example embodiment relates to a method comprising providing a housing defining a central compartment and an outlet. The housing comprises a housing sealing surface having a first non-planar surface. A cover defining an inlet and comprising a cover sealing surface having a second non-planar surface is provided. A filter media of a filter element is positioned in the central compartment. The filter element also comprises a seal member. The seal member comprises a complimentary non-planar sealing surface that matches the first non-planar surface and the second non-planar surface. The cover is coupled to the housing such that the seal member is axially pinched between the housing and the cover by the housing sealing surface and the cover sealing surface, so as to form a first seal between the seal member and the housing and a second seal between the seal member and the cover.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, a filtration system having both planar and non-planar portions (i.e., non-planar, arched, contoured, comprised of multiple intersecting planar sub-portions, etc.) sealing areas between the filtration system housing and the installed filter element is described.

Figure 1:
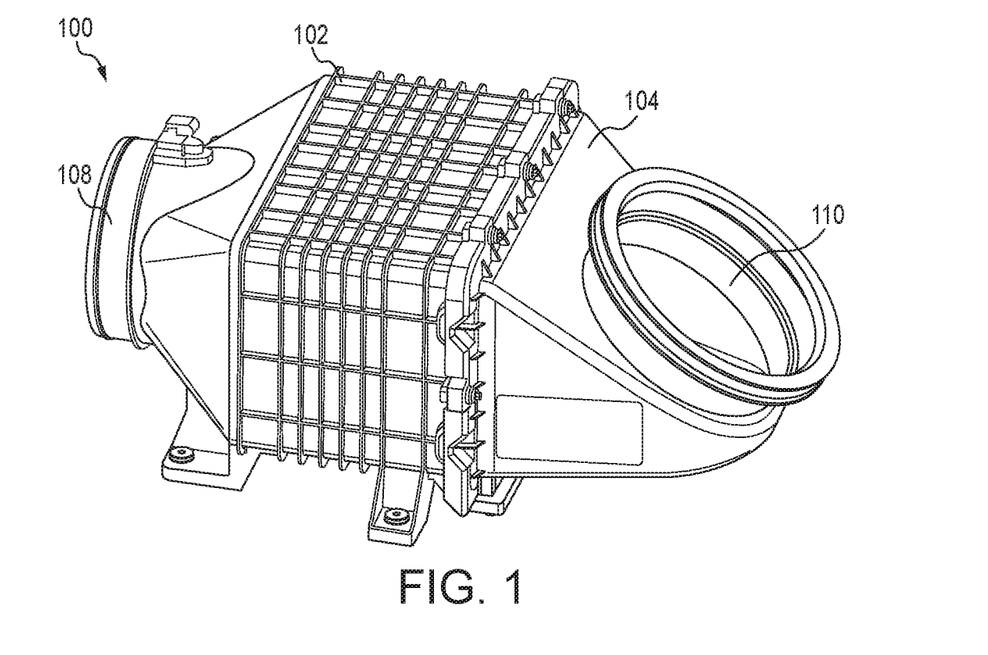
FIG. 1 shows a perspective view of a filtration system according to an example embodiment.
Figure 2:
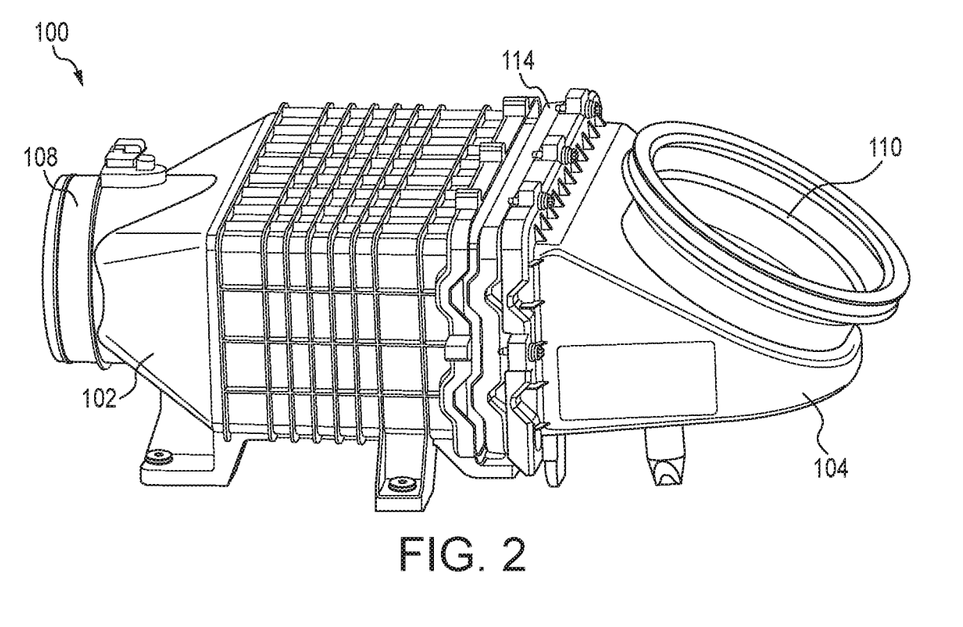
FIG. 2 shows a perspective view of the filtration system of FIG. 1 with the cover partially removed.
Figure 3:
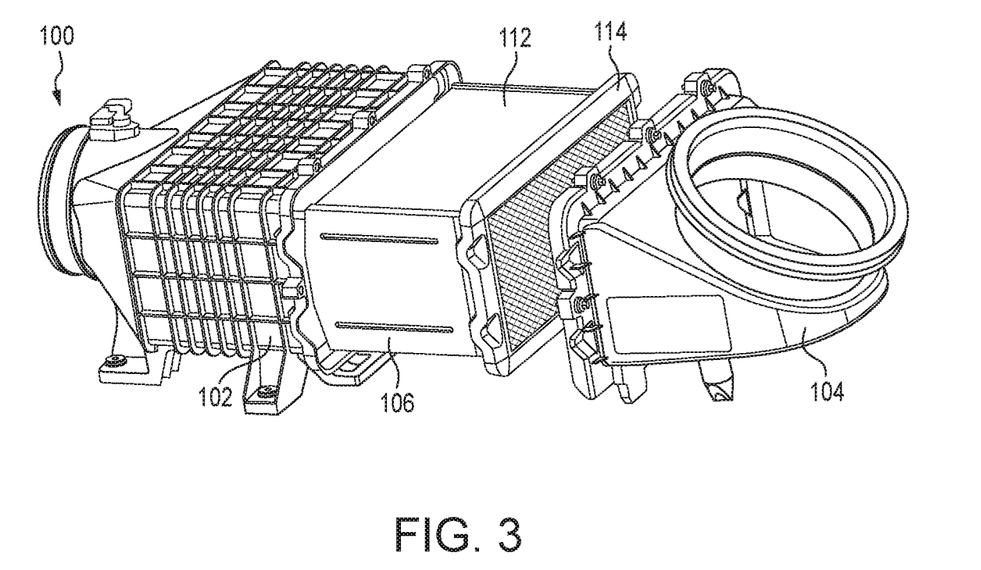
FIG. 3 shows an exploded view of the filtration system of FIG. 1.

Referring to FIGS. 1 through 3, various perspective views of a filtration system 100 are shown according to an example embodiment. FIG. 1 shows the filtration system 100 in a fully assembled state. FIG. 2 shows the filtration system 100 in a partially disassembled state. FIG. 3 shows the filtration system 100 in a fully disassembled state. The filtration system 100 generally includes a housing 102, a cover 104 removably coupled to the housing 102, and a filter element 106 installed in the filtration system 100. The housing 102 includes an outlet 108. The cover 104 includes an inlet 110. The housing 102 generally defines a central compartment configured to receive the filter element 106. When the filtration system 100 is fully assembled (e.g., as shown in FIG. 1), fluid to be filtered (e.g., air) flows into the inlet 110, through the filter element 106, and out the outlet 108. The outlet 108 may be in fluid communication with a downstream component, such as an internal combustion engine.

Figure 4:
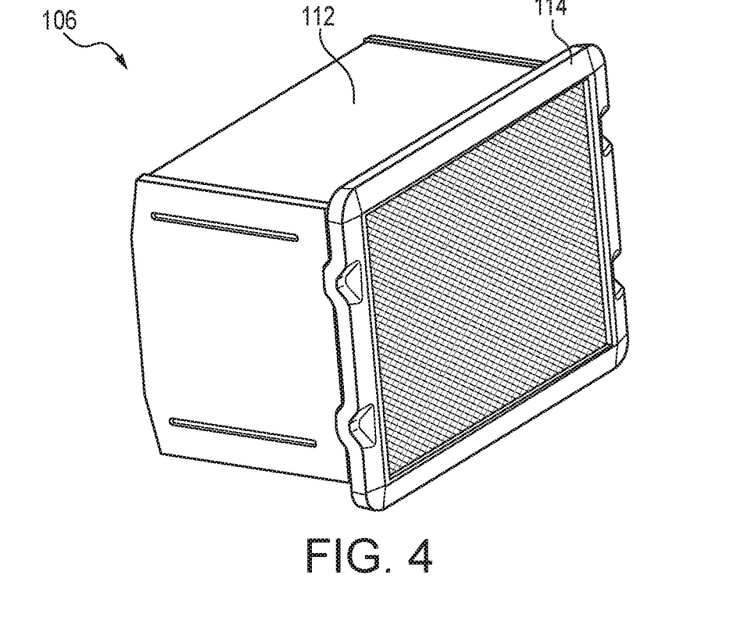
FIG. 4 shows a perspective view of a filter element of the filtration system of FIG. 1.

A perspective view of the filter element 106 is shown in FIG. 4. The filter element 106 comprises filter media 112 and a seal member 114. The filter media 112 may be, for example, pleated filter media arranged in a panel or pleat block. Although shown as being generally rectangular in shape, the filter element 106 may be arranged in other shapes, such as a cylinder, an oval, or the like.

The seal member 114 is comprised of and attached to the filter media 112 with an adhesive, such as polyurethane. In some arrangements, the seal member 114 includes an embedded frame member or stiffening member to help maintain the shape of the seal member 114. In further or additional arrangements, the seal member 114 is connected to the filter media 112 through an intermediate frame member, such as a circumferential support. As described in further detail below, the seal member 114 generally includes both planar portions and non-planar portions (i.e., curved, arched, contoured, portions comprised of multiple intersecting sub-portions, etc.) configured to interact with matching planar and curved surfaces of the housing 102 and the cover 104. The seal member 114 is an axial seal member configured to form a seal with the housing 102 and the cover 104 such that fluid being filtered through the filtration system 100 cannot bypass the filter element 106.

Figure 5:
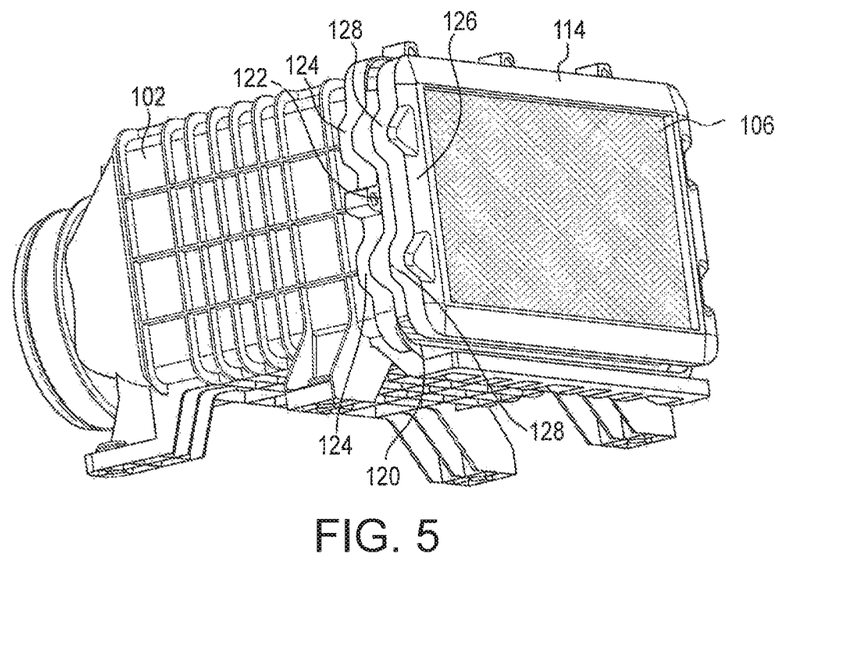
FIG. 5 shows a perspective view of the filter element of FIG. 4 being installed in the filtration system of FIG. 1.
Figure 6:
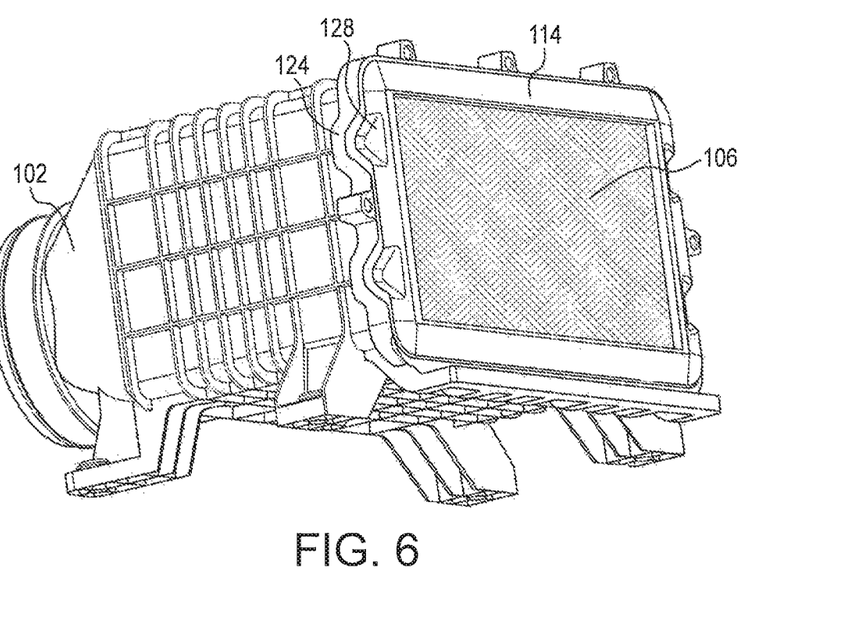
FIG. 6 shows a perspective view of the filter element of FIG. 4 fully seated in the filtration system of FIG. 1.
Figure 7:
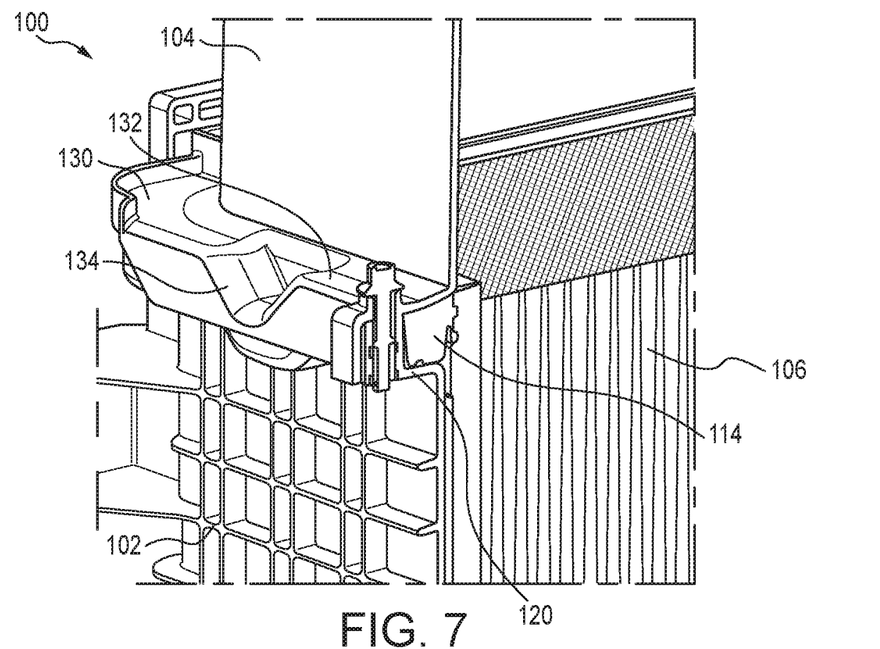
FIG. 7 shows a cross-sectional view of a planar seal area of the filtration system of FIG. 1.
Figure 8:
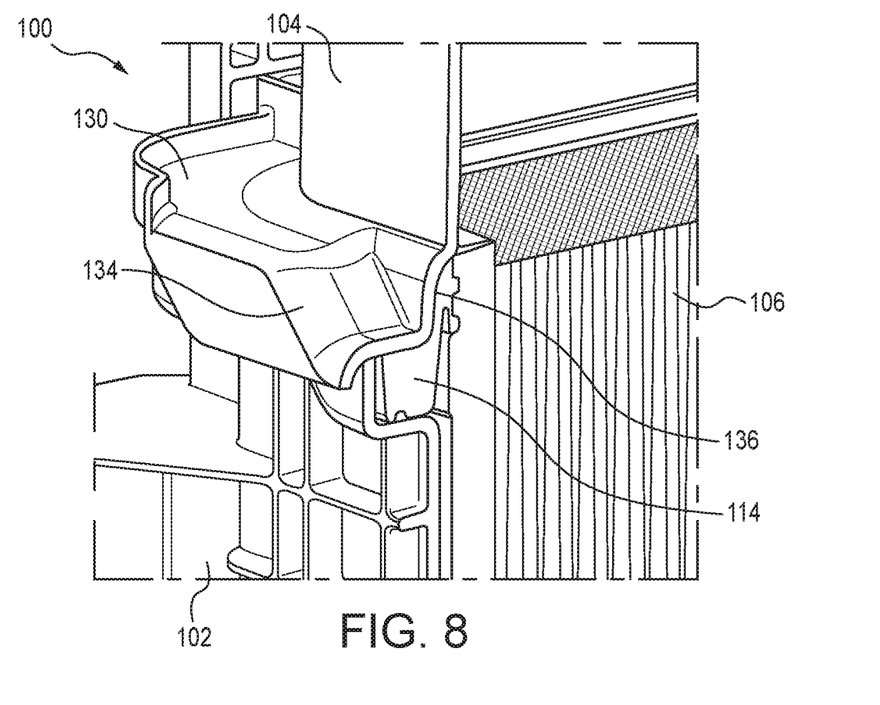
FIG. 8 shows a cross-sectional view of a contoured (i.e., non-planar) seal area of the filtration system of FIG. 1.
Figure 9:
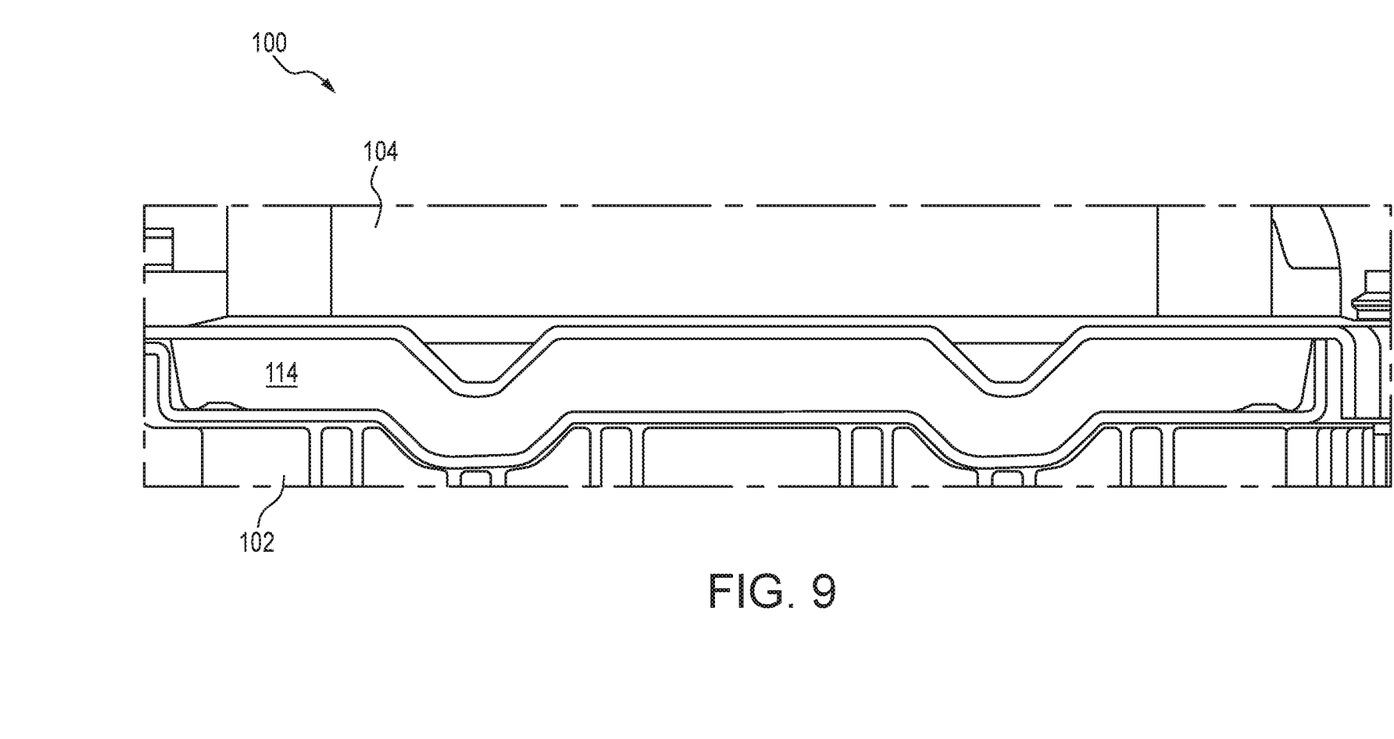
FIG. 9 shows a cross-sectional view of the sealing area of the filtration system of FIG. 1.

FIGS. 5 and 6 show the filter element 106 being installed (i.e., seated) into the housing 102. FIGS. 7, 8, and 9 show the filter element 106 fully installed in the filtration system 100 such that the seal member 114 is compressed between the housing 102 and the cover 104. As shown in FIG. 5, the filter media 112 of the filter element 106 is inserted into the central compartment of the housing 102. The housing 102 includes a housing sealing surface 120. The housing sealing surface 120 includes a planar portion 122 and non-planar portions 124 on two of four sides of the housing sealing surface 120. In some arrangements, the non-planar portions 124 are comprised of multiple planar sub-portions arranged at different angles relative to each other (e.g., to form a vertex, to form a plateau, etc.). In other arrangements, the non-planar portions 124 are comprised of a curved portion. In some arrangements, the curved portions are arched in shape. In such arrangements, the curved portions 124 may be concave recessed slits. The planar portion 122 and the non-planar portions 124 are sized and shaped to be complimentary to a corresponding planar portion 126 and non-planar portions 128 of the seal member 114. The non-planar portions 124 and 128 help align the filter element 106 in the housing 102 during installation. Since the filter element 106 and the housing 102 have complimentary sealing surfaces, the filter element 106 can be fully seated (i.e., installed) into the housing 102. The seal member 114 and the housing sealing surface 120 mesh in a keyed manner. If a filter element having a totally flat seal member or a seal member having a different contoured pattern (i.e., a non-approved, a non-genuine, non-authorized, etc.) is attempted to be installed in the housing 102, the filter element will not be able to be fully seated into the housing 102 or may not form a proper seal with the housing 102.

Similarly, as shown in FIGS. 7 and 8, the cover 104 has a cover sealing surface 130. The cover sealing surface 130 includes a planar portion 132 and non-planar portions 134 on two of four sides of the cover sealing surface 130. In some arrangements, the non-planar portions 134 are comprised of multiple planar sub-portions arranged at different angles relative to each other (e.g., to form a vertex, to form a plateau, etc.). In other arrangements, the non-planar portions 134 are comprised of a curved portion. The curved portions may be formed by an extension on the cover 104. In some arrangements, the curved portions are arched in shape. In such arrangements, the curved portions may be concave recessed slits. The planar portion 132 and the non-planar portions 134 are sized and shaped to be complimentary to a corresponding planar portion 126 and non-planar portions 128 of the seal member 114. The non-planar portions 134 and 128 help align the cover 104 with respect to the filter element 106 during installation. Since the filter element 106 and the cover 104 have complimentary sealing surfaces, the cover 104 can be fully seated against the filter element 106 and secured to the housing 102 (e.g., via fasteners, clamps, bolts, snap-fit connections, etc.). The seal member 114 and the cover sealing surface 130 mesh in a keyed manner. As shown best in FIG. 8, the arched portion 128 of the seal member 114 may be supported by an extension portion 136 of the seal member 114.

Referring to FIG. 9, a cross-sectional view of the sealing area of the filtration system 100 with the filter element 106 installed is shown. As shown more clearly in FIG. 9, the contoured portions of the seal member 114 complimentarily interact with the corresponding contoured portions of the cover 104 and the housing 102 to form seals between the filter element 106 and the cover 104 and the filter element 106 and the housing 102. A filter element without the matching contours would not fit in the filtration system 100.

Although the filter element 106 is shown as having a seal member 114 with four non-planar portions (two on two opposite sides), it should be understood that any number of non-planar portions may be used so long as the housing 102 and cover 104 having a matching number of non-planar portions aligned with the non-planar portions of the seal member 114 so as to allow the filter element 106 to be installed in the filtration system 100. Additionally, the non-planar portions may be symmetrical or varying in size across the housing 102, the cover 104, and the seal member 114.

The above described filtration system 100 allows only an authorized or approved filter element, such as the filter element 106, to be installed in the filtration system 100. The authorized filter element 106, the housing 102, and the cover 104 have matching non-planar sealing surfaces that help orient and stabilize the filter element 106 during installation, provide improved dimensional stability of the seal member 114, the housing 102, and/or the cover 104, and provides a one-way-only fit for the filter element 106 in the filtration system 100. The seal member 114 also has an increased surface area, which results in improved sealing against the housing 102 and the cover 104.

Figure 10:
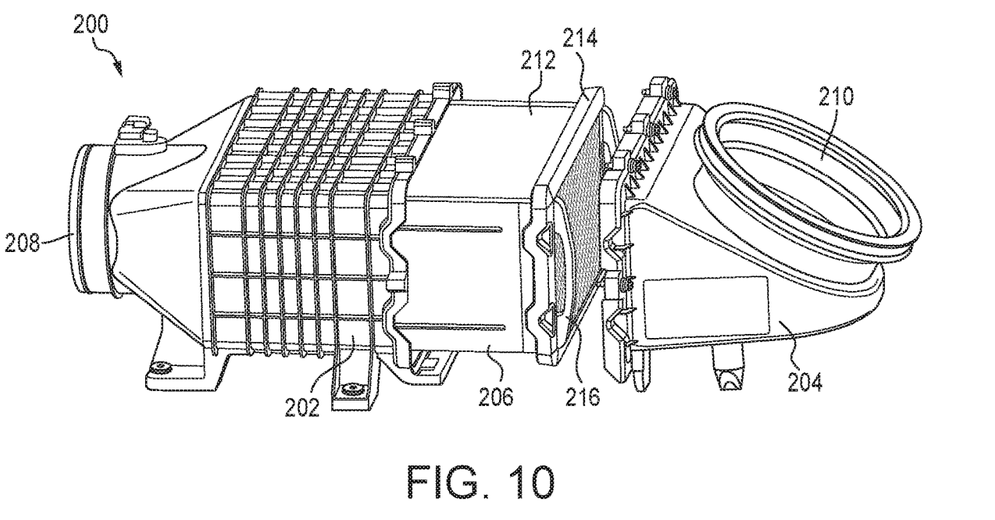
FIG. 10 shows an exploded view of a filtration systems, according to another embodiment.
Figure 11:
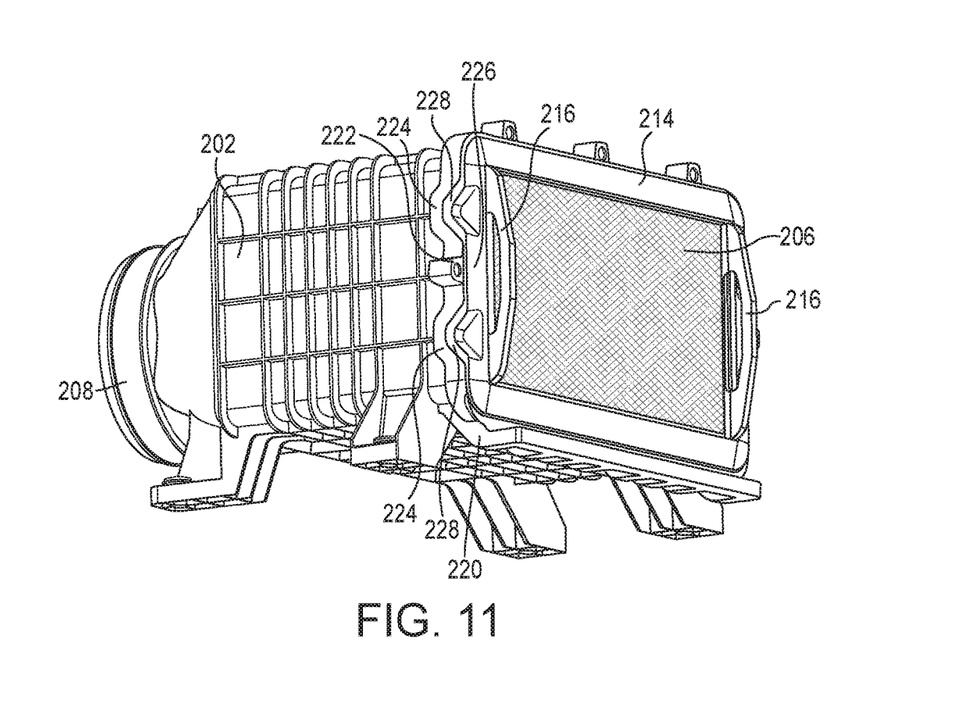
FIG. 11 shows a cross-sectional view of the sealing area of the filtration system of FIG. 10 with a cover of the filtration system removed from a housing of the filtration system.

FIG. 10 shows a filtration system 200 according to another embodiment in a partially disassembled state. The filtration system 200 includes a housing 202, a cover 204 removably coupled to the housing 202, and a filter element 206 installed in the filtration system 200. FIG. 11 shows the cover 204 removed from the housing 202, and the FIG. 12 shows a portion of the filter element 206.

The housing 202 includes an outlet 208. The cover 204 includes an inlet 210. The housing 202 generally defines a central compartment configured to receive the filter element 206. When the filtration system 200 is fully assembled, fluid to be filtered (e.g., air) flows into the inlet 210, through the filter element 206, and out of the outlet 208. The outlet 208 may be in fluid communication with a downstream component, such as an internal combustion engine.

Figure 12:
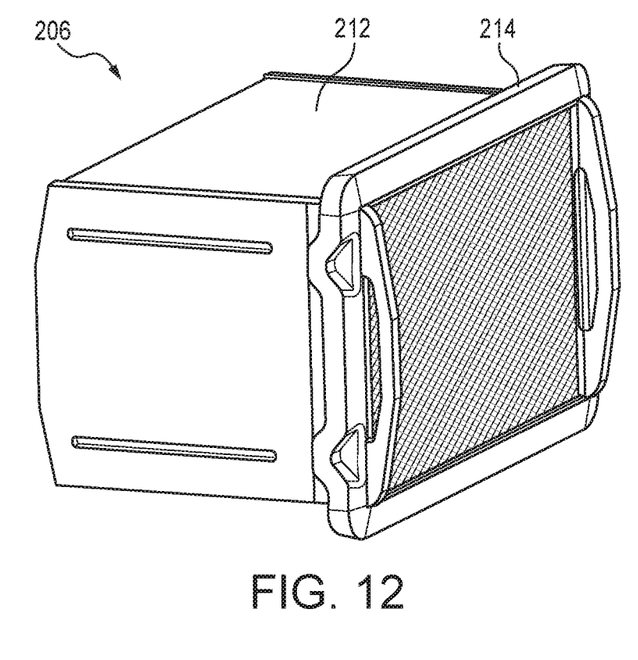
FIG. 12 shows a perspective view of a filter element of the filtration system of FIG. 10.

As shown in in FIG. 12, the filter element 206 comprises filter media 212 and a seal member 214. The filter media 212 may be, for example, pleated filter media arranged in a panel or pleat block. Although shown as being generally rectangular in shape, the filter element 206 may be arranged in other shapes, such as a cylinder, an oval, or the like.

The seal member 214 is comprised of and attached to the filter media 212 with an adhesive, such as polyurethane. In some arrangements, the seal member 214 includes an embedded frame member or stiffening member to help maintain the shape of the seal member 214. In further or additional arrangements, the seal member 214 is connected to the filter media 212 through an intermediate frame member, such as a circumferential support.

As described in further detail below, the seal member 214 generally includes both planar portions and non-planar portions (i.e., curved, arched, contoured, portions comprised of multiple intersecting sub-portions, etc.) configured to interact with matching planar and curved surfaces of the housing 202 and the cover 204. The seal member 214 may be an axial seal member configured to form a seal with the housing 202 and the cover 204 such that fluid being filtered through the filtration system 200 cannot bypass the filter element 206.

The filter element 206 may be substantially similar in structure and function to the filter element 106 apart from the following difference. The filter element 206 also comprises a plurality of handles 216 extending axially from an end of the filter element 206 towards the cover 204. In some embodiments, the plurality of handles 216 may be coupled to the seal member 214 or monolithically formed therewith (e.g., molded with the seal member 214). In other embodiments, the plurality of handles 216 may be coupled to the intermediate frame member or any other support structure of the filter element 206. The plurality of handles 216 may facilitate insertion and/or removal of the filter element 206 from the central compartment of the housing 202.

The filter media 212 of the filter element 206 is inserted into the central compartment of the housing 202. The housing 202 includes a housing sealing surface 220 including a planar portion 222 and non-planar portions 224 on two of four sides of the housing sealing surface 120. The planar portion 222 and the non-planar portions 224 are sized and shaped to be complimentary to a corresponding planar portion 226 and non-planar portions 228 of the seal member 214. The housing 202 may be substantially similar in structure and function to the housing 102 and therefore not described in further detail herein.

The cover 204 also has a cover sealing surface including a planar portion and non-planar portions on two of four sides of the cover sealing surface. The planar portion and the non-planar portions are sized and shaped to be complimentary to a corresponding planar portion 226 and non-planar portions 228 of the seal member 214. The cover 204 may be substantially similar in structure and function to the cover 104 and therefore not described in further detail herein.

Figure 13:
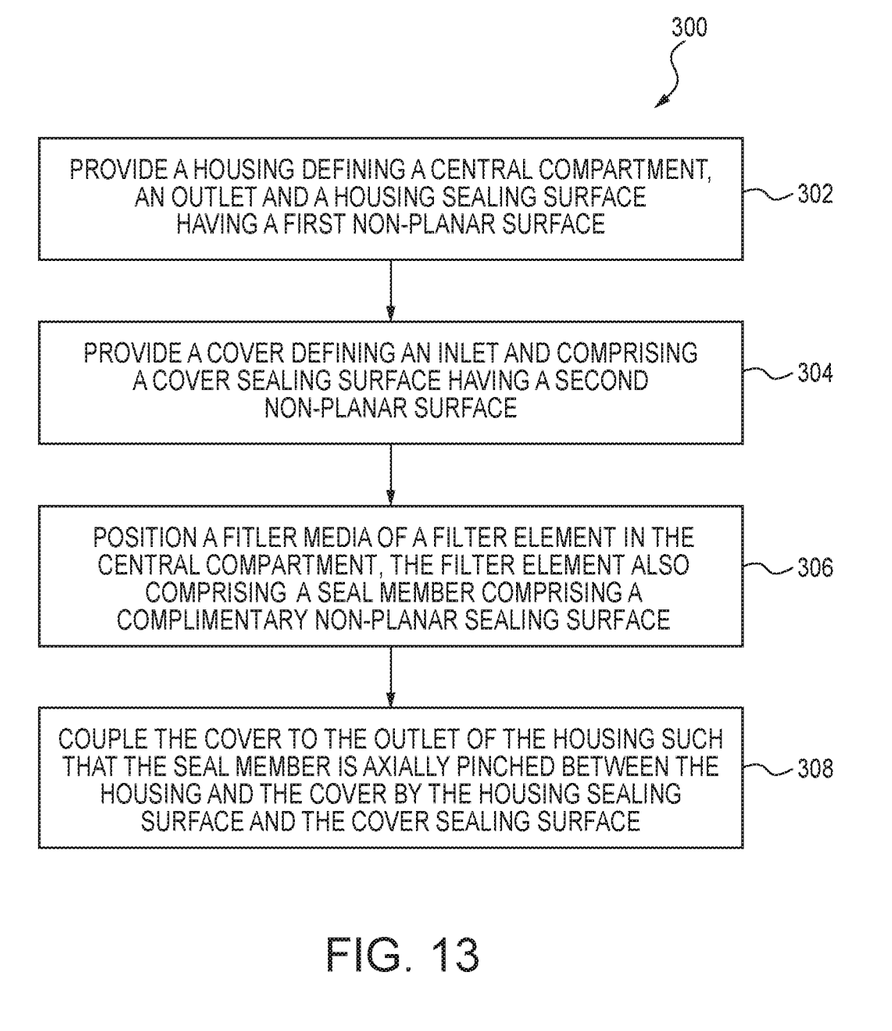
FIG. 13 is a schematic flow diagram of an example method for providing a filtration system.

FIG. 13 is a schematic flow diagram of an example method 300 for providing a filtration system (e.g., the filtration system 100, 200). The method 300 comprises providing a housing defining a central compartment and an outlet, and further comprising a housing sealing surface having a first non-planar surface, at 302. For example, the housing 102, 202 defining the central compartment and the outlet 108, 208 is provided. The housing 102, 202 comprises the housing sealing surface 120, 220 having a first non-planar surface that includes planar portions 222 and non-planar portions 224, as previously described herein.

At 304, a cover defining an inlet and comprising a cover sealing surface having a second non-planar surface is provided. For example, the cover 104, 204 defining the inlet 110, 210 and having the cover sealing surface 130 is provided. The cover sealing surface 130 includes the planar portions 132 and non-planar portions 134, as previously described herein.

At 306, a filter media of a filter element is positioned in the central compartment of the housing. The filter element also comprises a seal member comprising a complimentary non-planar sealing surface that matches the first non-planar surface and the second non-planar surface. For example, the filter media 112, 212 of the filter element 106, 206 is positioned in the central compartment of the housing 102, 202. The filter element 106, 206 also comprises the seal member 114, 214 having the complimentary non-planar sealing surface that includes planar portions 226 and non-planar portions 228 generally corresponding to the planar portions 122, 222, 132 and non-planar portions 124, 224, 134 of the housing 102 and the cover 104, respectively.

At 308, the cover is coupled to the outlet of the housing such that the seal member is axially pinched between the housing and the cover by the housing sealing surface and the cover sealing surface so as to form a first seal between the seal member and the housing and a second seal between the seal member and the cover. For example, the cover 104, 204 is coupled to the housing 102, 202 such that the seal member 114, 214 is pinched between the housing 102, 202 and the cover 104, 204 by the housing sealing surface 120, 220 and the cover sealing surface 130, as previously described herein.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filtration system comprising:
   a housing defining a central compartment and an outlet and comprising a housing sealing surface having a first non-planar surface;
   a cover removably coupled to the housing, the cover defining an inlet and comprising a cover sealing surface having a second non-planar surface; and
   a filter element comprising filter media and a seal member, the filter element removably received in the central compartment, the seal member comprising a complimentary non-planar sealing surface that matches the first non-planar surface and the second non-planar surface, each of the first non-planar surface and the second non-planar surface comprise a planar portion and non-planar portion, the non-planar portion comprises a triangular indentation defined axially in the seal member such that a vertex of the triangular indentation is located proximate to the housing sealing surface, the triangular indentation defined at an outer edge of the sealing member and having a width that is less than a width of the sealing member, the seal member axially pinched between the housing and the cover by the housing sealing surface and the cover sealing surface to form a first seal between the seal member and the housing and a second seal between the seal member and the cover.

2. The filtration system of claim 1, wherein the planar portion and the non-planar portion are defined on at least two of four sides of the first non-planar surface and the second non-planar surface.

3. The filtration system of claim 1, wherein each of the first non-planar surface and the second non-planar surface comprise a plurality of non-planar portions positioned symmetrically across the first non-planar surface and the second non-planar surface.

4. The filtration system of claim 1, wherein the non-planar portion comprises a plurality of intersecting planar subsections.

5. The filtration system of claim 1, wherein the filter element further comprises at least one handle extending axially from an end of the filter element towards the cover.

6. A filter element removably receivable within a central compartment of a housing, comprising:
   filter media; and
   a seal member, the seal member comprising a complimentary non-planar sealing surface that matches (a) a first non-planar surface of a housing sealing surface of the housing and (b) a second non-planar surface of a cover sealing surface of a cover that is removably coupleable to the housing, each of the first non-planar surface and the second non-planar surface comprise a planar portion and non-planar portion, the non-planar portion comprises a triangular indentation defined axially in the seal member such that a vertex of the triangular indentation is located proximate to the housing sealing surface, the triangular indentation defined at an outer edge of the sealing member and having a width that is less than a width of the sealing member,
   wherein, when the filter element, the housing, and the cover are in a fully assembled state, the seal member is axially pinched between the housing and the cover by the housing sealing surface and the cover sealing surface to form a first seal between the seal member and the housing and a second seal between the seal member and the cover.

7. The filter element of claim 6, wherein the planar portion and the non-planar portion are defined on at least two of four side sides of the complimentary non-planar sealing surface.

8. The filter element of claim 6, wherein the complimentary non-planar sealing surface comprises a plurality of non-planar portions positioned symmetrically across the complimentary non-planar sealing surface.

9. The filter element of claim 6, wherein the non-planar portion comprises a plurality of intersecting planar subsections.

10. The filter element of claim 6, further comprising at least one handle extending axially from an end of the filter element towards the cover.

11. A method, comprising:
    providing a housing defining a central compartment and an outlet, the housing comprising a housing sealing surface having a first non-planar surface;
    providing a cover defining an inlet and comprising a cover sealing surface having a second non-planar surface;
    positioning a filter media of a filter element in the central compartment, the filter element also comprising a seal member, the seal member comprising a complimentary non-planar sealing surface that matches the first non-planar surface and the second non-planar surface, each of the first non-planar surface and the second non-planar surface comprise a planar portion and non-planar portion, the non-planar portion comprises a triangular indentation defined axially in the seal member such that a vertex of the triangular indentation is located proximate to the housing sealing surface, the triangular indentation defined at an outer edge of the sealing member and having a width that is less than a width of the sealing member; and
    coupling the cover to the housing such that the seal member is axially pinched between the housing and the cover by the housing sealing surface and the cover sealing surface so as to form a first seal between the seal member and the housing and a second seal between the seal member and the cover.

12. The method of claim 11, wherein the non-planar portion comprises a plurality of intersecting planar subsections.

13. The method of claim 11, wherein the filter element further comprises at least one handle extending axially from an end of the filter element towards the cover.

* * * * *